United States Patent
Wu

[11] Patent Number: 5,915,568
[45] Date of Patent: Jun. 29, 1999

[54] MULTIPLE STATION CD-ROM TESTING SYSTEM

[75] Inventor: Chin-Ching Wu, Chung-Li, Taiwan

[73] Assignee: Behavior Tech Computer Corp., Taipei, Taiwan

[21] Appl. No.: 09/017,694

[22] Filed: Feb. 3, 1997

[51] Int. Cl.$^6$ ............................... B07C 5/00; B07C 5/34; B07C 5/342; G11B 17/22

[52] U.S. Cl. .......................... 209/552; 209/555; 209/583; 209/587; 369/34

[58] Field of Search ..................................... 209/576, 577, 209/578, 579, 583, 587, 552, 555; 369/34

[56] References Cited

U.S. PATENT DOCUMENTS

| | | | |
|---|---|---|---|
| 4,997,552 | 3/1991 | Schlinkmann et al. | 209/552 |
| 5,787,057 | 7/1998 | Fan | 369/34 |
| 5,814,829 | 9/1998 | Broude et al. | 209/555 |
| 5,822,207 | 10/1998 | Hazama et al. | 364/468.03 |

*Primary Examiner*—William E. Terrell
*Assistant Examiner*—Joe Dillon, Jr.
*Attorney, Agent, or Firm*—Rosenberg, Klein & Bilker

[57] ABSTRACT

A multiple station CD-ROM testing system includes a conveyance device, a first gripping device, a multiple station testing device having a number of testing stations arranged in a vertically stacked fashion, a second gripping device, a collection device, and a controlling device comprised of a single programmable logic control and a single personal computer. The conveyance device carries the CD-ROMs fed into the system forward. The first gripping device picks up the CD-ROMs on the conveyance device and positions the CD-ROMs into the testing stations of the multiple station testing device to have the CD-ROMs tested therein by means of the controlling device and removes the tested CD-ROMs out of the multiple station testing device and places them back to the conveyance device. The second gripping device picks up the tested CD-ROMs on the conveyance device and transfers the tested CD-ROMs to either a next process if the CD-ROMs pass the test or a flaw product collection device if the CD-ROMs fail the test. Such an arrangement allows a number of testing stations to be integrated into a single testing device in a vertically stacked manner so that a number of CD-ROMs may be tested/inspected at the same time and only a limited floor area is needed to install the single set of testing device. The efficiency and effectiveness of inspection of the CD-ROM products is significantly enhanced and the manufacturing efficiency increased and the cost reduced.

9 Claims, 6 Drawing Sheets

MULTIPLE STATION CD-ROM TESTING SYSTEM

FIELD OF THE INVENTION

The present invention relates to a CD-ROM testing system and in particular to a CD-ROM testing apparatus in which a plurality of testing stations are arranged in a vertical stack fashion which, together with software controlled operation provided by a processor based controller, provides a compact and efficient multiple station testing apparatus.

BACKGROUND OF THE INVENTION

The efficiency and use of personal computers have benefited various businesses and household works and nowadays, the personal computers have been one of the most popular consumer goods available in the market. With the development of the computer techniques, a CD-ROM which provides a great storage of data and a more efficient access to the stored data has now become a standard peripheral device of the personal computers. Thus, the manufacture of the CD-ROM and the quality control of the manufactured CD-ROM are one of the most important issues for the computer peripheral device manufacturers.

In the conventional manufacturing process of the CD-ROM, testing/inspecting the CD-ROM products is very important and is one of the most time-consuming jobs that are encountered in the manufacturing process. In the conventional way, the CD-ROM is tested/inspected manually by experienced operators on a one by one basis to check all the functions and operation of the CD-ROM. Quite obviously, the efficiency of such a way in inspecting the CD-ROM is quite low and can hardly be improved.

To overcome such a low efficiency problem, automatic testing apparatus has been suggested, which comprises a personal computer to cooperate with a programmable logic control for performing test on the CD-ROM in an automatic manner. This, although cutting down the human labour needed in testing/inspecting the CD-ROM, requires an individual set of personal computer and programmable logic control for each testing station so that in case that a number of testing stations are set up, there must be the same number of sets of personal computers and programmable logic controls installed. This may significantly increase the installation cost of the CD-ROM manufacturing line.

Further, setting up a number of such kind of CD-ROM testing stations also needs quite a great floor area and this adds the installation fee of the CD-ROM manufacturing line.

Thus, it is desirable to have a CD-ROM testing system which allows one single set of personal computer and programmable logic control to be used to handle a number of testing stations and the testing stations are arranged in a compact, space efficient fashion.

SUMMARY OF THE INVENTION

Therefore, an object of the present invention is to provide a multiple station CD-ROM testing system which is capable to perform test on a number of CD-ROMs at the same time. The CD-ROM testing system comprises a conveyance device, a first gripping device, a multiple station testing device having a number of testing stations arranged in a vertically stacked fashion, a second gripping device, a collection device, and a controlling device comprised of a single programmable logic control and a single personal computer, wherein the conveyance device carries the CD-ROMs fed into the system forward, the first gripping device picks up the CD-ROMs on the conveyance device and positions the CD-ROMs into the testing stations of the multiple station testing device to have the CD-ROMs tested therein by means of the controlling device and removes the tested CD-ROMs out of the multiple station testing device and places them back to the conveyance device and the second gripping device picks up the tested CD-ROMs on the conveyance device and transfers the tested CD-ROMs to either a next process if the CD-ROMs pass the test or a flaw product collection device if the CD-ROMs fail the test. Such an arrangement allows a number of testing stations to be integrated into a single testing device in a vertically stacked manner so that a number of CD-ROMs may be tested/inspected at the same time and only a limited floor area is needed to install the single set of testing device. The efficiency and effectiveness of inspection of the CD-ROM products is significantly enhanced and the manufacturing efficiency increased and the cost reduced.

Another object of the present invention is to provide a multiple station CD-ROM testing system having a number of testing stations integrated together, wherein a single set of programmable logic control and personal computer is sufficient to control the test performed on a number of CD-ROMs positioned in the number of testing stations so that the installation cost is significantly reduced.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
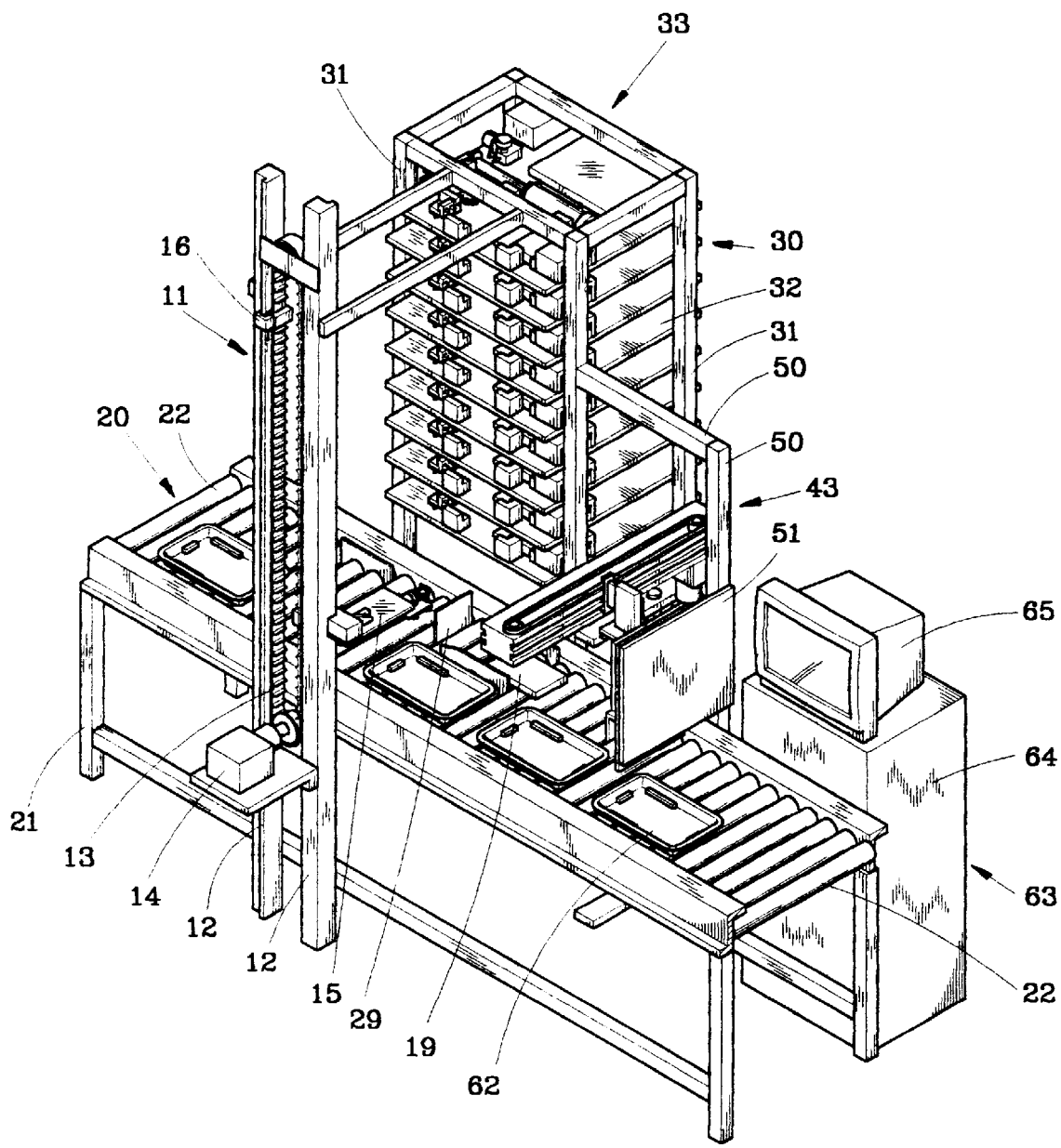
FIG. 1 is a perspective view showing a multiple station CD-ROM testing system in accordance with the present invention.

With reference to the drawings and in particular to FIG. 1 in which a multiple station CD-ROM testing system in accordance with the present invention, generally designated at 10, is shown, the multiple station CD-ROM testing system 10 comprises a first gripping device 11, a conveyance device 20, a multiple station testing device 30 comprising a number of testing stations 33, a second gripping device 43, a collection device 55, a controlling device 63 comprised of a programmable logic control (PLC) 64 and a personal computer 65. The multiple station CD-ROM testing system 10 is adapted to be arranged in a CD-ROM manufacturing line to perform test on the CD-ROMs for quality control purpose.

As shown in the drawings, the first gripping device 11 of the multiple station CD-ROM testing apparatus 10 comprises a movable pick-up arm 15 which is arranged above and transverse to the conveyance device 20 to sequentially pick up a number of CD-ROMs 19 to be tested in a one by one manner and position the pickedup CD-ROMs 19 into each of the testing stations 33 of the multiple station testing device 30 and to remove the CD-ROMs 19 that have been tested in the testing stations 33 out thereof and put the CD-ROMs 19 back to the conveyance device 20.

The conveyance device 20 conveys a number of CD-ROMs 19 fed into the multiple station CD-ROM testing system 10 in a longitudinal direction along which the conveyance device 20 extends among the above listed devices. The conveyance device 20 cooperates with stop plates and guide plates to be further described to precisely position the CD-ROMs at desired points along the conveyance device 20.

The multiple station testing device 30 has a multiple level configuration, each level accommodating at least and preferably one of the testing stations 33, so as to allow the multiple station testing device 30 to simultaneously perform test on a number of CD-ROMs positioned within the testing stations 33.

The second gripping device 42 is arranged to pick up the already tested CD-ROMs 19 on the conveyance device 20 and place the so picked-up CD-ROMs 19 into support trays 62 arranged on another area of the conveyance device 20 in case that the CD-ROMs 19 pass the test performed thereon so as to transfer to the next process (not shown) of the CD-ROM manufacturing line. For those CD-ROMs 19 that fail in the test, the second gripping device 42 picks up the failure CD-ROMs 19 from the conveyance device 20 and places them into a collection tray 60 of the collection device 55 to be forwarded to for example a manual inspection/repairing station (not shown).

The controlling device 63 that is comprised of the programmable logic control 64 and the personal computer 65 is controlled by software, such as computer programs, loaded in advance in the personal computer 65 and/or the programmable logic control 64 to handle and control the operation of the multiple station CD-ROM test system 10, including controlling the operations of driving elements, such as motors, power cylinders and suction cups, and to control power and signal transmission of each of the testing stations 33 in performing the test as well as forwarding the test result to the personal computer 65 to be stored therein.

The parts and constructions of the above listed devices will be now described. As shown in FIGS. 1 and 2, the first gripping device 11 is arranged on an outer side of the conveyance device 20, comprising two upright posts 12 fixed at the outer side of the conveyance device 20, an endless belt 13 surrounding two pulleys that are arranged between the two upright posts 12 and respectively in the proximity of upper and lower ends of the posts 12, a motor 14 arranged outside the two upright posts 12 and engaging the belt 13 via the pulleys to drive the belt 13, a pick-up arm 15 having one end fixed to the belt 13 to be movable therewith and slidably engaging and guided by one of the upright posts 12 and an opposite end extending laterally over the conveyance device 20, a counter weight 16 slidably engaging the other one of the upright posts 12 to be symmetrical to the pick-up arm 15 and fixed to the belt 13 to be movable therewith and a power cylinder 17 having an end fixed to the pick-up arm 15 and an opposite free end extending laterally over the conveyance device 20. The power cylinder 17 comprises a plurality of suction cups 18 fixed to a cylinder rod (not shown) of the power cylinder 17.

Figure 2A:
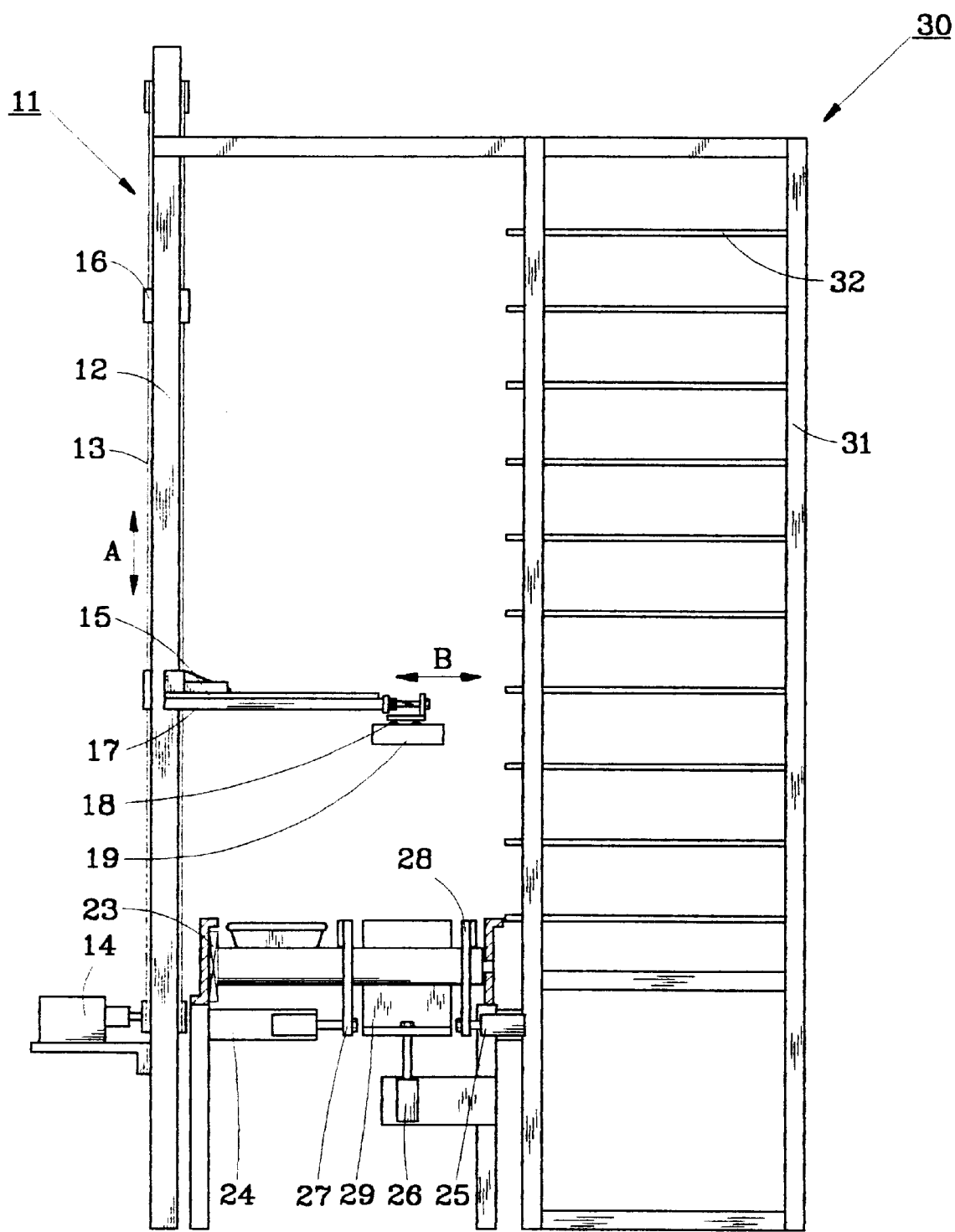
FIG. 2A is a front elevational view of a portion of the multiple station CD-ROM testing system of the present invention, showing the spatial relationship of the first gripping device and the framework of the multiple station testing device with respect to the conveyance, wherein a CD-ROM to be tested is picked up by the first gripping device.
Figure 2B:
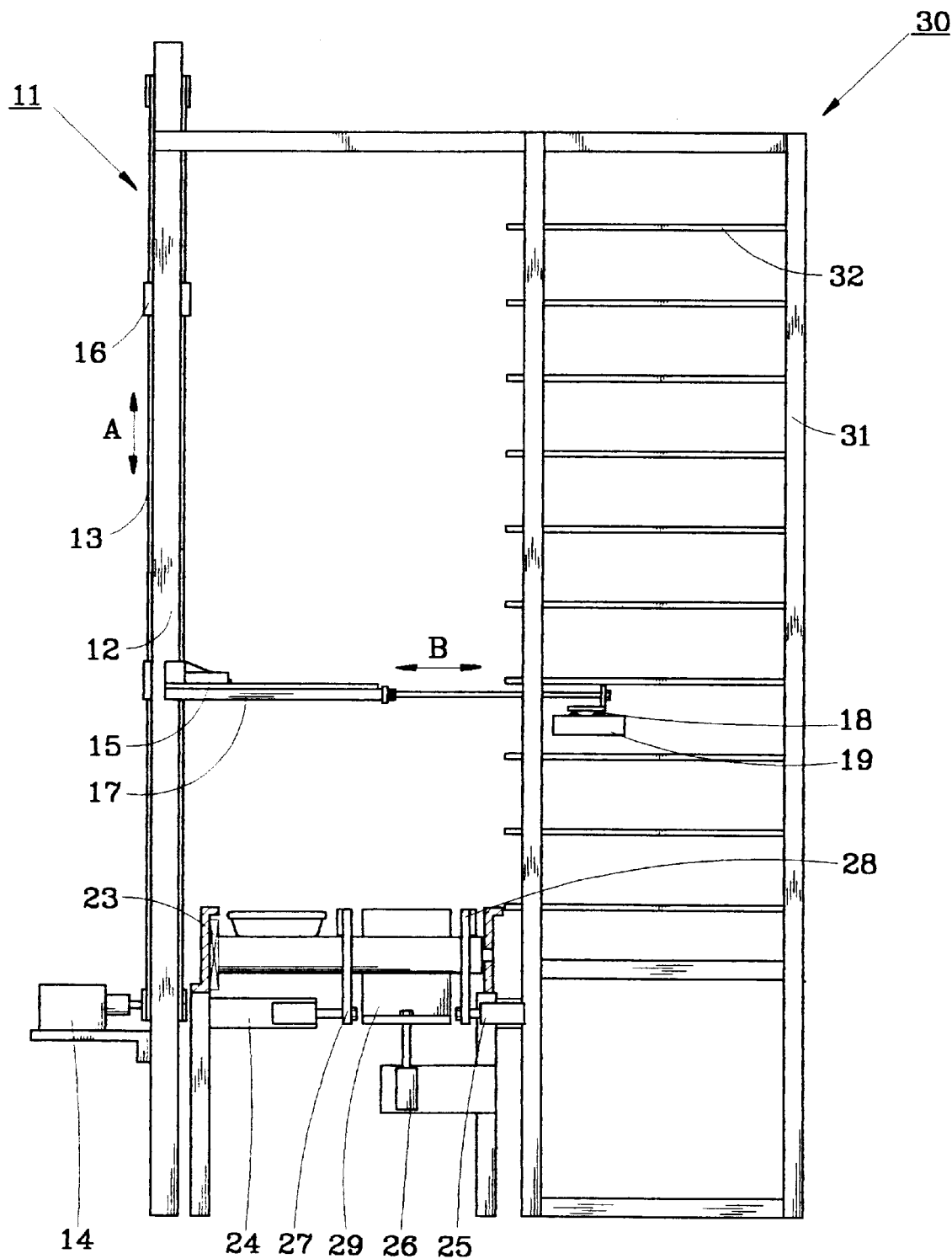
FIG. 2B is a view similar to FIG. 1, but showing the CD-ROM picked up by the first gripping device is moved into one of the testing stations of the multiple station testing device.

The pick-up arm 15 is driven to move along the upright post 12 when the belt 13 is moved by the motor 14 under the control of the controlling device 63, as indicated by arrow A shown in FIG. 2A or 2B. The counter weight 16 serves to stabilize the movement of the pick-up arm 15 along the post 12. The power cylinder 17 and the suction cups 18 are also controlled by the controlling device 63 to extend and retract the suction cups 18 across the conveyance device 20 as indicated by arrow B shown in FIG. 2A or 2B. By means of such an arrangement and movement, the first gripping device 11 is capable to move the pick-up arm 15 to pick up the CD-ROMs 19 to be tested positioned on the conveyance device 20 located below the pickup arm 15 one by one and sequentially positions the CD-ROMs 19 into each of the testing stations 33 of the multiple station testing device 30 and to remove the CD-ROMs 19 that have been tested out of the testing stations 33 and put the CD-ROMs 19 back to the conveyance device 20.

Figure 3:
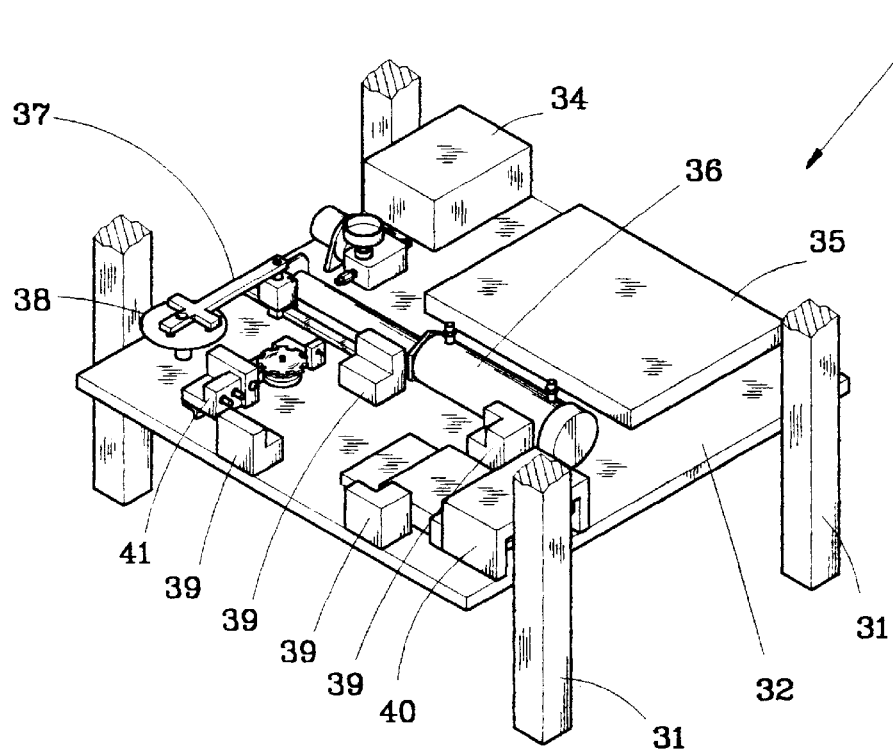
FIG. 3 is a perspective view of the multiple station CD-ROM testing system, showing one of the testing stations of the multiple station testing device, wherein no CD-ROM is positioned therein.

As shown in FIGS. 2 and 3, the conveyance device 20 is arranged between the first gripping device 11 and the multiple station testing device 30, comprising a roller conveyor constituted by two support frames 21 defining two sides of the conveyance device 20, a plurality of rollers 22 supported by and extending between the two support frames 21 and a chain 23 disposed along one of the support frames 21 and drivingly engaging the rollers 22.

Two laterally arranged power cylinders 24 and 25 located under a central section of the roller conveyor and having cylinder rods opposite to each other to respectively drive a longitudinally extending guide plate 27 or 28 which is transversely movably fit over some of the rollers 22 of the central section. For example, the longitudinally extending guide plates 27 and 28 may be provided with holes through which the rollers 22 extend. The holes may be greater in diameter than the rollers 22 so as to allow the guide plates 27 and 28 to be movable with respect to the rollers 22. The power cylinders 24 and 25 are designed to drive the longitudinally extending guide plates 27 and 28 in the lateral direction which is substantially normal to the moving direction or the longitudinal direction of the roller conveyor. The guide plates 27 and 28 are spaced from each other to define a passage therebetween through which the CD-ROMs carried and moved by the rollers 22 may pass. The power cylinders 24 and 25 may be selectively activated to change the position of the passage relative to the side support frames 21 and the spacing between the two guides plates 27 and 28. This provides a precise way to guide the movement of the CD-ROMs 19 and to control the positioning of the moving CD-ROMs 19 under the second gripping device 43.

A vertically extending power cylinder 26 arranged under the roller conveyor and preferably between the two guide plates 27 and 28. The power cylinder 26 has a cylinder rod arranged to extend in the vertical direction to move a laterally extending stop plate 29, which is arranged between two adjacent ones of the rollers 22 and extending in the lateral direction, with respect to the rollers 22 in the vertical direction for stopping and positioning the CD-ROMs 19 that is moved along the roller conveyor precisely under the suction cups 18 of the first gripping device 11. This allows the suction cups 18 of the first gripping device 11 to engage and thus pick up a CD-ROM 19 on the roller conveyor when the stop plate 29 is moved to an upper position to stop the CD-ROM 19. When the stop plate 29 is moved to a lower position, the CD-ROM 19 that is stopped by the stop plate 29 is allowed to resume movement along the conveyance device 20 and pass through the passage defined by the longitudinally extending guide plates 27 and 28 to reach a position under suction cups 49 provided on the second gripping device 43 to be picked up thereby.

As shown in FIGS. 1, 2 and 3, the multiple station testing device 30 is arranged at an inner side of the conveyance device 20, comprising a parallelepiped framework defined by four upright bars 31 and having an interior space within which a plurality of horizontal floor plates 32 are provided and fixed to the upright bars 31 to define a multiple level configuration having a plurality of partitioned spaces, each accommodating at least one testing station 33.

Figure 4:
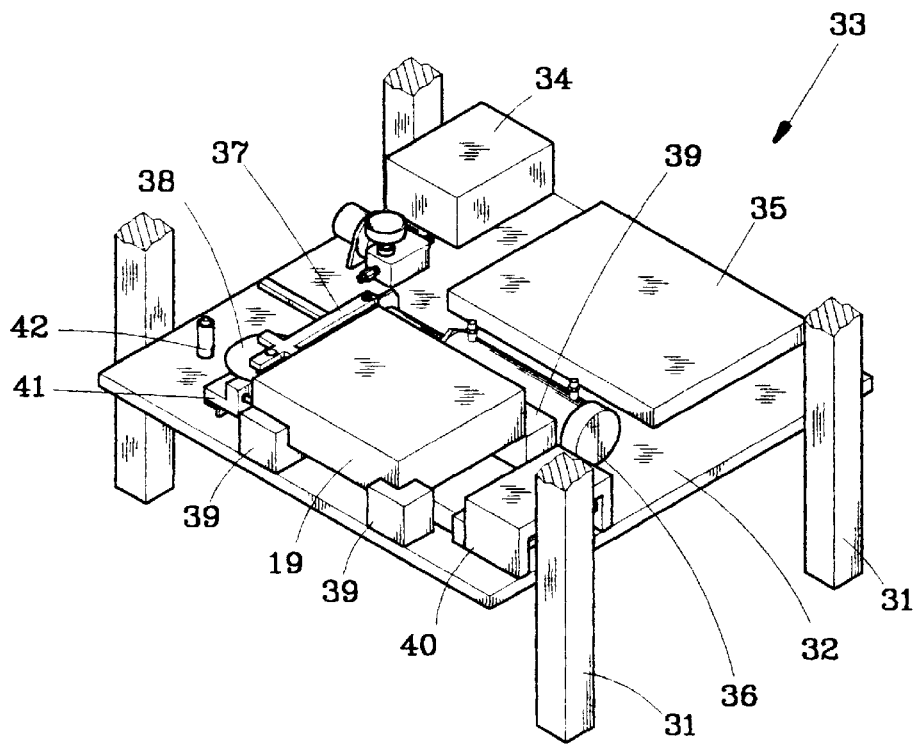
FIG. 4 is a view similar to FIG. 3, but showing a CD-ROM is positioned in the testing station and an optical disk is about to be positioned into the CD-ROM.

As shown in FIGS. 3 and 4, the testing stations 33 are identical in both configuration and function and have a construction similar to a personal computer, comprising a power supply 34 for supplying power to the testing station 33, a main board 35 on which circuits and electrical/electronic devices are arranged to perform control of the operation of the testing station 33, a power cylinder 36 for driving an arm 37 having a suction cup supported thereon to pick up and transfer an optic disk 38 between a disk support 42 and the CD-ROM 19 positioned in the testing station 33, a plurality of support legs 39, preferably four, each having a recess for receiving and holding the CD-ROM 19 therein constituting a CD-ROM holder for firmly supporting and holding the CD-ROM 19 to be tested, a set of power and signal connector 40 arranged on rear side of the CD-ROM holder for supply of power to the CD-ROM 19 to be tested and transmission of signals therebetween and a button actuator 41 arranged on front side of the CD-ROM holder for actuating push buttons of the CD-ROM 19 to be tested in order to test the CD-ROM 19.

The optic disk 38 may be test disk which when played by the CD-ROM 19 to be tested generates a signal representing the information on the optic disk 38. The signal is transmitted to the controlling device 63 via the power and signal connector 40 to be analysed thereby for determining if the CD-ROM 19 functions well. The display of the optic disk 38 is controlled by the button actuator 41 which may be selectively driven to engage and actuate the push buttons that are regularly provided on the front panel of a CD-ROM. Power is supplied from the power and signal connector 40 to the CD-ROM 19. In this respect, the power and signal connector 40 may be movable with respect to the CD-ROM 19 to selectively establish/break engagement between the CD-ROM 19 and the power and signal connector 40.

Figure 5:
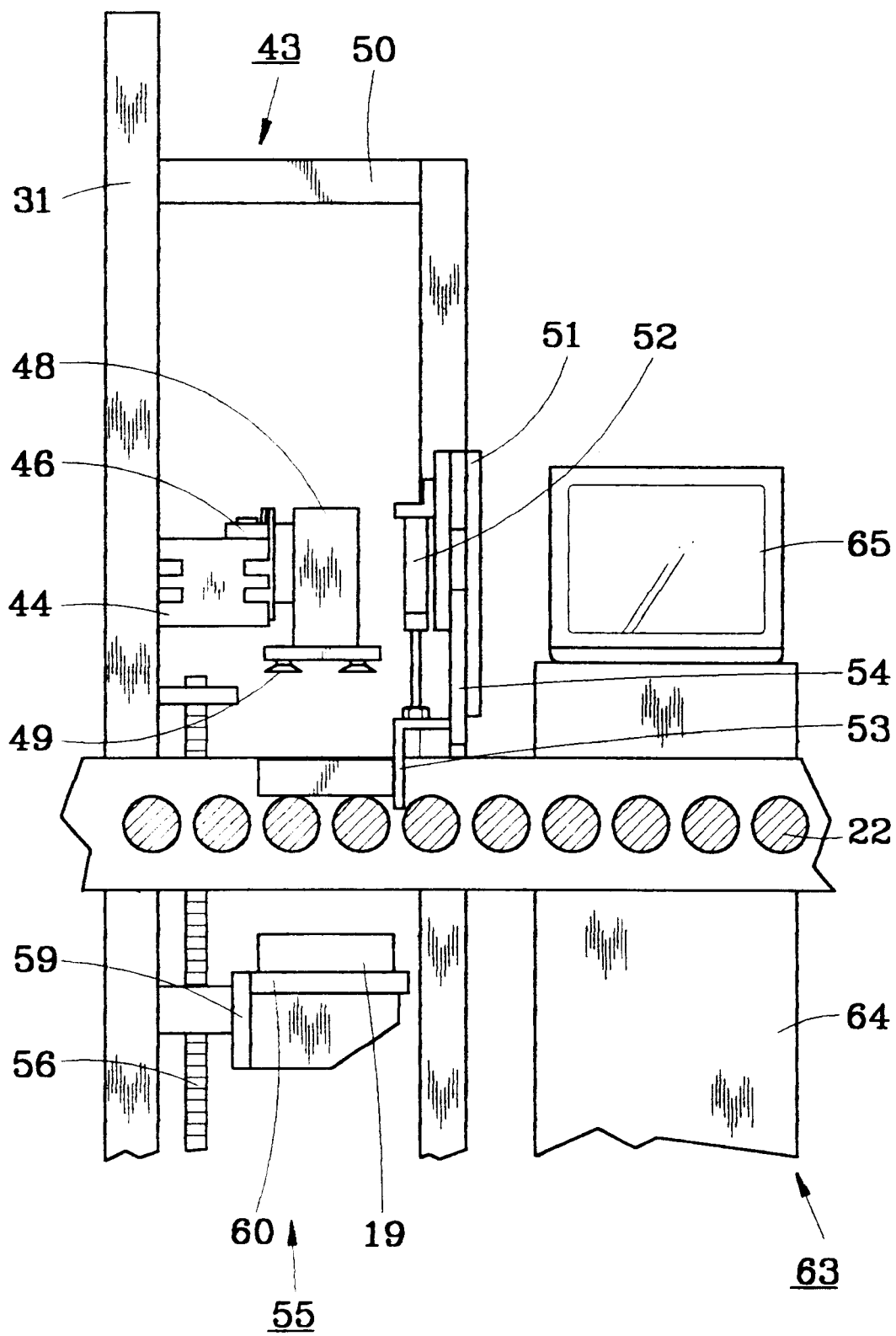
FIG. 5 is a partial cross-sectional view showing the conveyance device and the second gripping device of the multiple station CD-ROM testing system of the present invention, as well as the controlling device.
Figure 6:
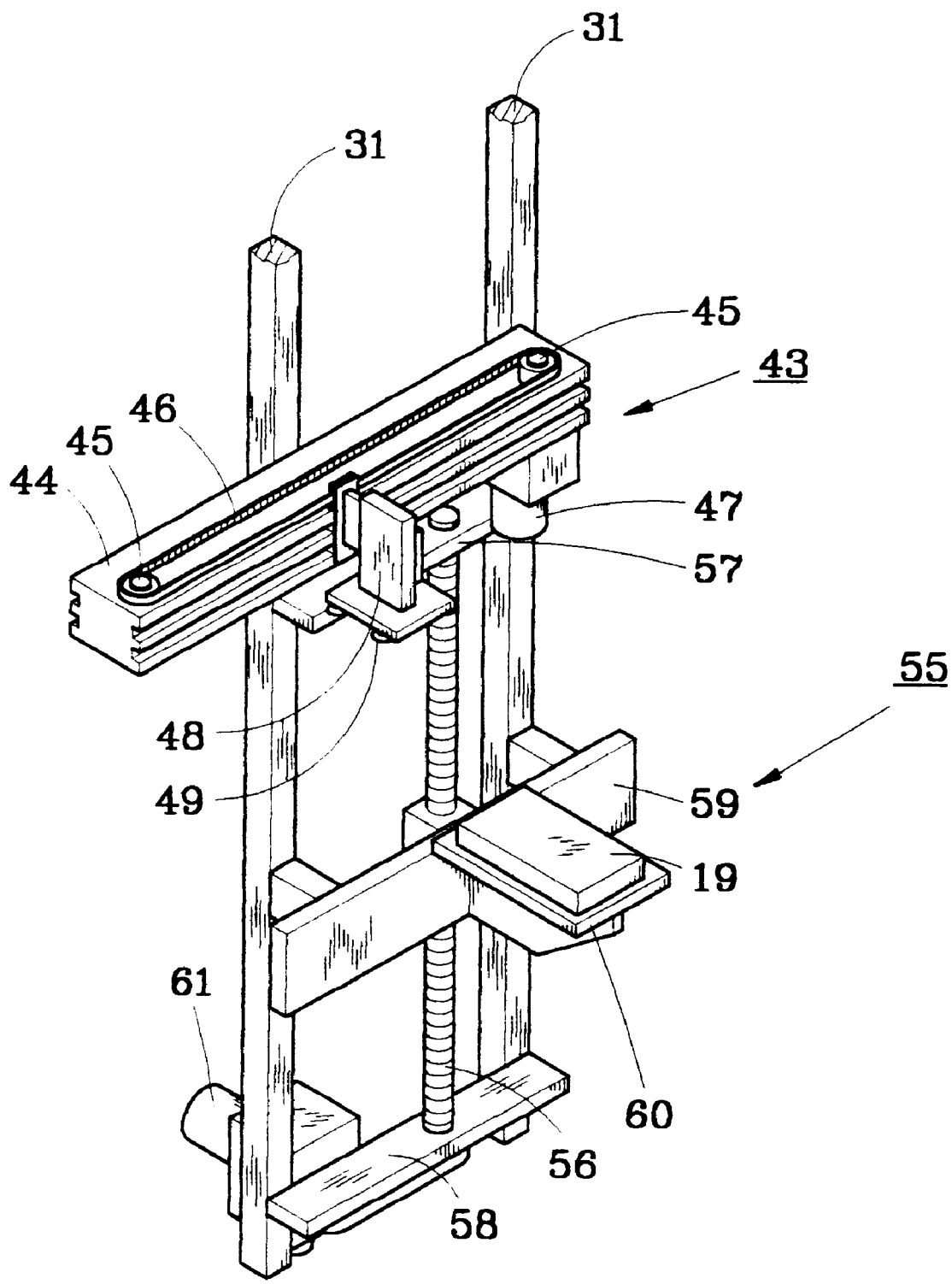
FIG. 6 is a perspective view of a portion of the multiple station CD-ROM testing system of the present invention, showing the second gripping device and the collection device thereof.

As shown in FIGS. 1, 5 and 6, the second gripping device 43 is arranged on the inner side of the conveyance device 20 and between the multiple station testing device 30 and the controlling device 63, comprising a laterally extending rail 44 having an end fixed to two of the upright bars 31 of the multiple station testing device 30 and an opposite end extending transverse to and above the roller conveyor of the conveyance device 20, an endless belt 46 surrounding two pulleys 45 disposed on the rail 44, a motor 47 fixed to the rail 44 and mechanically coupled to the belt 46 for driving the belt 46, a suction cup support 48 fixed to the belt 46 to be movable therewith and slidably engaging the rail 44 to be guided thereby so that the suction cup support 48 is movable along the rail 44 by the motor 47 via the belt-pulley coupling, and the suction cups 49 are mounted to the underside of the suction cup support 48 for picking up and positioning the CD-ROMs 19 from/to the conveyance device 20.

An L-shaped bracket 50 has a first branch fixed to and horizontally extending from one of the upright bars 31 of the multiple station testing device 30 and a second branch extending vertically downward to which a plate-like rail 51 is fixed, having a central spacing slidably accommodating a slide plate 54 which is movable relative to the bracket 50 by being sliding within and guided by the plate-like rail 51. A stop plate 53 is fixed to the slide plate 54 and movable therewith so as to be positionable at such a location with respect to the roller conveyor as to stop the movement of the CD-ROMs 19 along the roller conveyor. A power cylinder 52 is fixed to the plate-like rail 51 and having a cylinder rod coupled to the stop plate 53 so that by means of the guidance of the movement of the slide plate 54 provided by the plate-like rail 51 and by means of the actuation of the power cylinder 52, the stop plate 53 may be selectively driven to the position with respect to the roller conveyor for stopping the movement of the CD-ROMs 19. This allows the suction cups 49 to engage and pick up and transfer the CD-ROMs 19 to the support trays 62 and/or the collection tray 60 of the collection device 55.

As shown in FIGS. 5 and 6, the collection device 55 is arranged under the second gripping device 43, comprising a screw rod 56 rotatably supported between two support plates 57 and 58 which are fixed to the upright bars 31 of the multiple station testing device 30, a movable member 59 arranged between the support plates 57 and 58 and drivingly engaged by the screw rod 56 with the collection tray 60 mounted thereto to support CD-ROMs 19 stacked thereon, a motor 61 fixed to the support plate 58 and coupled to the screw rod 56 for driving the screw rod 56 to move the collection tray 60 along the screw rod 56. By means of such an arrangement, the CD-ROMs transferred by the second gripping device 43 may be stacked over the collection tray 60 until the number of the CD-ROMs 19 that are stacked on the collection tray 60 reaches a predetermined value. In this way, the movement of the collection tray 60 driven by the motor 61 may be reduced so as to cut down power consumption by the motor 61.

The operation of the multiple station CD-ROM testing system 10 may be controlled by means of pre-loaded software executed in the controlling device 63 comprised of the programmable logic control 64 and the personal computer 65. The CD-ROMs 19 are continuously fed into the multiple station CD-ROM testing system 10 by being carried by the roller conveyor of the conveyance device 20 and then picked up, when passing the under side of the first gripping device 11, and positioned into each of the testing stations 33 of the multiple station testing device 30 one by one by the first gripping device 11. At the same time when the CD-ROMs are individually positioned into the testing stations 33, tests are performed on the CD-ROMs that have been deposited into the previous testing stations 33 under the control of the controlling device 63 and the first gripping device 11 may move the CD-ROMs that have been tested completely out of the testing stations 33 before newly arrived CD-ROMs are put into the testing stations 33. The CD-ROMs 19 removed out of the testing stations 33 are placed back onto the conveyance device 20 and be carried forward thereby. If the CD-ROMs pass the test, the controlling device 63, in response to the test result, uses the second gripping device 43 to pick up the CD-ROMs and deposits the CD-ROMs into the support trays 62 on the conveyance device 20 and carried thereby to a station (not shown) which performs the next processing steps. On the other hand, if the CD-ROMs fail the test, the second gripping device 43 forwards the CD-ROMs to the collection device 55 and stacks the CD-ROMs on the collection tray 60 which will then be transferred to for example a manual inspection/repairing station once the number of the CD-ROMs stacked on the collection tray 60 reaches the pre-determined value.

In the above described operation, the movement of the CD-ROMs along the conveyance device 20 is controlled by the stop plates 29 and 53 and guide plates 27 and 28 driven by the power cylinders 24, 25, 26 and 52 in order to precisely positioning the CD-ROMs with respect to the first and second gripping devices 11 and 43 so as to allow the CD-ROMs to be properly picked up by the gripping devices 11 and 43.

The present invention provides a multiple station CD-ROM testing system having a multiple level configuration of the arrangement of a number of testing stations which is compact and reduces the space occupied thereby. Further, with the provision of the first and second gripping devices, the transfer of the CD-ROMs may be controlled in a more efficient manner which allows the CD-ROMs to be continuously supplied to the testing stations and tested therein without any interruption so as to significantly increase the efficiency in testing a great number of CD-ROMs. Also, the quality control of the CD-ROMs is also ensured with the system of the present invention for the test is carried out completely automatically. Since the system is controlled and operating fully automatically and since only computer software is needed in controlling the whole process, human labour needed in the testing process is minimized and this helps cutting the manufacturing cost down. Meanwhile, using the software to control the test process also offers the advantage of flexibility in testing CD-ROMs of different requirements.

The above description is made with respect to the preferred embodiment of the present invention and for those skilled in the art, it is possible to make a variety of modifications and changes to the above-described specific embodiment without departing from the scope and spirit of the present invention. All these modifications and changes should be considered within the scope of the present invention as defined in the appended claims.

What is claimed is:

1. A multiple station CD-ROM testing apparatus comprising a first gripping device, a conveyance device for moving a number of CD-ROMs fed into the apparatus in a longitudinal direction, a multiple station testing device comprising a plurality of testing stations, a second gripping device, a collection device and a controlling device, wherein:

the first gripping device comprising a pick-up arm extending above the conveyance device to sequentially pick up the CD-ROMs and position the picked-up CD-ROMs into each of the testing stations of the multiple station testing device to allow the CD-ROMs to be tested in the testing stations and to remove the tested CD-ROMs out of the multiple station testing device;

the conveyance device is arranged to extend in the longitudinal direction for moving the CD-ROMs to the first gripping device and the second gripping device, the conveyance device comprising CD-ROM positioning means for precisely positioning the CD-ROMs at locations along the conveyance device that correspond to the first and second gripping devices;

the multiple station testing device comprises a multiple level configuration having a plurality of levels arranged to be above each other in a vertical stack fashion, each of the levels defining at least one of the testing stations;

the second gripping device is arranged to pick up the tested CD-ROMs that are removed out of the multiple station testing device by the first gripping device and position the picked up CD-ROMs to carrier means for moving to a next processing station; and the controlling device comprising a programmable logic control and a personal computer which are operable by software pre-loaded therein to control operation of the system and store test result of the CD-ROMs in the personal computer.

2. The multiple station CD-ROM testing system as claimed in claim 1, wherein the first gripping device is arranged at an outer side of the conveyance device, comprising two upright posts extending vertically and located at the outer side of the conveyance device, an endless belt surrounding two pulleys respectively arranged at upper and lower ends of the upright posts and supported between the posts, a motor arranged on an outer side of the posts and coupled to the belt via the pulleys to move the belt, the pick-up arm which has one end fixed to the belt to be movable therewith and slidably engaging one of the posts to be guided thereby, a counter weight fixed to the belt and slidably engaging the other one of the posts to be symmetric to the pick-up arm, and a power cylinder fixed to the pick-up arm and extending over the conveyance device with suction cups mounted to a cylinder rod of the power cylinder so that when the motor is activated by the controlling device, the pick-up arm is moved along the post via the pulleys and the belt, the counter weight serving to stabilise the movement of the pick-up arm along the post, the suction cups and the power cylinder being controlled by the controlling device to engage and pick up the CD-ROMs on the conveyance device and transfer the picked-up CD-ROMs into each of the testing stations of the multiple station testing device and to pick up and remove the tested CD-ROMs out of the testing stations.

3. The multiple station CD-ROM testing system as claimed in claim 1, wherein the conveyance device is arranged between the first gripping device and the multiple station testing device, comprising a roller conveyor comprising two support frames defining two sides of the conveyance device, a plurality of rollers supported by and extending between the two support frames and a chain disposed along one of the support frames and drivingly engaging the rollers, two laterally arranged power cylinders located under a central section of the roller conveyor and having cylinder rods opposite to each other to respectively drive two guide plates of the positioning means which are spaced from each other and are laterally movably fit over some of the rollers of the central section to change the spacing therebetween, a vertically extending power cylinder arranged under the roller conveyor and between the two guide plates, the vertically extending power cylinder having a cylinder rod extending vertically to move a laterally extending stop plate of the positioning means which is arranged between and movable with respect to two adjacent ones of the rollers for selectively stopping the movement of the CD-ROMs along the conveyance device to precisely position the CD-ROMs under suction cups of the first gripping device so as to allow the suction cups to engage and pick up the CD-ROMs, the spacing between the two guide plates defining a passage through which the CD-ROMs that are not stopped by the stop plate move and are guided to a position under the suction cups of the second gripping device to be engaged by the suction cups of the second gripping device.

4. The multiple station CD-ROM testing system as claimed in claim 1, wherein the second gripping device is arranged on inner side of the conveyance device and between the multiple station testing device and the controlling device, comprising a laterally extending rail having an end fixed to four upright bars of the multiple station testing device and an opposite end extending transverse to and above a roller conveyor of the conveyance device, an endless belt surrounding two pulleys disposed on the rail, a motor fixed to the rail and coupled to the pulleys for driving the belt, a suction cup support fixed to the belt to be movable therewith and slidably engaging the rail to be guided thereby so that the suction cup support is movable along the rail by the motor via the belt and the pulleys, suction cups mounted to the suction cup support for picking up/positioning the CD-ROMs from/to the conveyance device, an L-shaped bracket having a first branch fixed to and horizontally extending from the upright bars of the multiple station testing device and a second branch extending vertically downward to which a plate-like rail is fixed, having a central spacing slidably accommodating therein a slide plate which is movable relative to the bracket by being sliding within and guided by the plate-like rail, a stop plate fixed to the slide plate and movable therewith so as to be positionable at such a location with respect to the roller conveyor as to stop the movement of the CD-ROMs along the roller conveyor, a power cylinder fixed to the plate-like rail and having a cylinder rod coupled to the stop plate so that by means of the guidance of the movement of the slide plate provided by the plate-like rail and by means of the actuation of the power cylinder, the stop plate may be selectively driven to the position with respect to the roller conveyor for stopping the movement of the CD-ROMs to allow the suction cups to engage and pick up and transfer the CD-ROMs to the carrier means.

5. The multiple station CD-ROM testing system as claimed in claim 1, wherein the carrier means comprises a support tray which is moved by and along the conveyance device to transport the CD-ROM supported therein to the next processing station.

6. The multiple station CD-ROM testing system as claimed in claim 1, wherein the multiple station testing device is arranged at an inner side of the conveyance device, comprising a parallelepiped framework defined by four upright bars and having an interior space within which a plurality of horizontal plates are provided and fixed to the upright bars to each define a level of the multiple level configuration, each of the levels having at least one of the testing stations provided thereon.

7. The multiple station CD-ROM testing system as claimed in claim 6, wherein each of the testing stations comprises a power supply for supplying power to the testing station, a main board for controlling testing operation performed by the testing station, a power cylinder for driving an arm having suction means supported thereon adapted to pick up and transfer an optic disk between a disk support and a CD-ROM positioned in the testing station, a plurality of support legs, each having a recess for receiving and supporting the CD-ROM to constitute a CD-ROM holder for firmly supporting and holding the CD-ROM to be tested, a set of power and signal connectors arranged on a rear side of the CD-ROM holder for supply of power to the CD-ROM to be tested and transmission of signals therebetween and a button actuator arranged on a front side of the CD-ROM holder for actuating push buttons of the CD-ROM to be tested in order to test the CD-ROM.

8. The multiple station CD-ROM testing system as claimed in claim 1, wherein the collection device is arranged under the second gripping device, comprising a screw rod rotatably supported between two support plates which are fixed to four upright bars of the multiple station testing device, a movable member arranged between the support plates and drivingly engaged by the screw rod with the carrier means mounted thereto to support CD-ROMs stacked thereon, a motor fixed to the support plate and coupled to the screw rod for driving the screw rod to move the collection tray along the screw rod.

9. The multiple station CD-ROM testing system as claimed in claim 8, wherein the carrier means comprises a collection tray on which a plurality of CD-ROMs are stacked to be transferred to the next processing station and wherein the next processing station comprises a manual inspection/repairing station.

* * * * *

UNITED STATES PATENT AND TRADEMARK OFFICE
CERTIFICATE OF CORRECTION

PATENT NO. : 5,915,568
DATED : 29 JUNE 1999
INVENTOR(S) : CHIN-CHING WU

It is certified that error appears in the above-identified patent and that said Letters Patent is hereby corrected as shown below:

Title page, item [22]; DELETE THE INCORRECT FILING DATE "Feb. 3, 1997" AND INSERT --Feb. 3, 1998--

Signed and Sealed this

Fifteenth Day of August, 2000

Attest:

Q. TODD DICKINSON

Attesting Officer

Director of Patents and Trademarks